(12) United States Patent
Jiang et al.

(10) Patent No.: US 11,339,867 B2
(45) Date of Patent: May 24, 2022

(54) DRIVING APPARATUS

(71) Applicants: DAIHEN CORPORATION, Osaka (JP); NIKON CORPORATION, Tokyo (JP)

(72) Inventors: Nan Jiang, Osaka (JP); Hiroshi Nakagiri, Osaka (JP); Kota Hoshijima, Osaka (JP); Kenji Omata, Utsunomiya (JP)

(73) Assignees: DAIHEN CORPORATION, Osaka (JP); NIKON CORPORATION, Tokyo (JP)

(*) Notice: Subject to any disclaimer, the term of this patent is extended or adjusted under 35 U.S.C. 154(b) by 267 days.

(21) Appl. No.: 16/110,907

(22) Filed: Aug. 23, 2018

(65) Prior Publication Data

US 2018/0363757 A1 Dec. 20, 2018

Related U.S. Application Data

(63) Continuation of application No. PCT/JP2017/005080, filed on Feb. 13, 2017.

(30) Foreign Application Priority Data

Feb. 25, 2016 (JP) ................................ 2016-033850

(51) Int. Cl.
*F16H 57/02* (2012.01)
*F16H 57/029* (2012.01)
(Continued)

(52) U.S. Cl.
CPC ............ *F16H 57/029* (2013.01); *B25J 17/00* (2013.01); *F16C 35/06* (2013.01); *F16H 1/28* (2013.01);
(Continued)

(58) Field of Classification Search
CPC combination set(s) only.
See application file for complete search history.

(56) References Cited

U.S. PATENT DOCUMENTS 6,155,364 A * 12/2000 Nagano ................. H02K 7/006
180/65.235
2002/0002869 A1   1/2002 Mori et al.
(Continued)

FOREIGN PATENT DOCUMENTS

EP    2264865 A2   12/2010
JP    2522495 Y2   10/1996
(Continued)

OTHER PUBLICATIONS

Extended European Search Report in Europe Application No. 17756276.6, dated Aug. 9, 2019, 9 pages.

*Primary Examiner* — Zakaria Elahmadi
(74) *Attorney, Agent, or Firm* — Crowell & Moring LLP (57) ABSTRACT

A driving apparatus has a problem in that foreign matter, such as grease, in a reduction gear moves from the reduction gear to a coupling side. Therefore, a driving apparatus includes an input shaft with a hollow space, a motor that rotates the input shaft, a reduction gear that receives the power of the motor from the input shaft, an output shaft inserted through the hollow space of the input shaft and adapted to rotate about the rotation axis of the motor, and a coupling connected to a tip end of the output shaft. A first limiting member for limiting the movement of foreign matter in the reduction gear toward the coupling side is arranged between the reduction gear and the coupling.

6 Claims, 9 Drawing Sheets

(51) Int. Cl.
*F16C 35/06* (2006.01)
*B25J 17/00* (2006.01)
*H02K 11/21* (2016.01)
*F16H 1/28* (2006.01)
*F16H 57/021* (2012.01)
*F16H 57/04* (2010.01)
*H02K 5/10* (2006.01)
*H02K 7/00* (2006.01)
*H02K 7/08* (2006.01)
*H02K 7/116* (2006.01)

(52) U.S. Cl.
CPC ....... *F16H 57/021* (2013.01); *F16H 57/0464* (2013.01); *F16H 57/0486* (2013.01); *H02K 5/10* (2013.01); *H02K 7/003* (2013.01); *H02K 7/083* (2013.01); *H02K 7/116* (2013.01); *H02K 11/21* (2016.01)

(56) References Cited

U.S. PATENT DOCUMENTS

| | | | | |
|---|---|---|---|---|
| 2007/0295557 | A1* | 12/2007 | Aldridge | F16C 33/6659 184/13.1 |
| 2008/0113843 | A1* | 5/2008 | Kenmotsu | F16H 57/038 475/222 |
| 2008/0238098 | A1* | 10/2008 | Becquerelle | H02K 7/116 290/3 |
| 2010/0269770 | A1* | 10/2010 | Kokubo | H02K 7/14 123/90.15 |
| 2010/0319478 | A1 | 12/2010 | Tominaga | |
| 2011/0273043 | A1* | 11/2011 | Raad | H02K 7/003 310/83 |
| 2011/0290071 | A1* | 12/2011 | Giessner | B60K 6/48 74/640 |
| 2013/0153338 | A1* | 6/2013 | Yamauchi | F01M 1/16 184/26 |
| 2013/0340553 | A1* | 12/2013 | Durrenberger | A61B 17/1697 74/412 R |
| 2014/0196551 | A1* | 7/2014 | Leggott | F01M 13/00 74/15.82 |
| 2015/0038277 | A1* | 2/2015 | Tamura | H02K 7/108 475/150 |
| 2015/0053040 | A1 | 2/2015 | Ueda et al. | |
| 2015/0236570 | A1* | 8/2015 | Hayashi | H02K 11/33 310/45 |
| 2016/0072366 | A1 | 3/2016 | Omata et al. | |
| 2016/0087491 | A1* | 3/2016 | Duhamel | H02K 3/522 301/6.5 |
| 2016/0160997 | A1* | 6/2016 | Biro | B60B 27/0026 74/409 |
| 2016/0181885 | A1* | 6/2016 | Yamasaki | B62D 5/0403 180/443 |
| 2016/0230873 | A1* | 8/2016 | Thelen | F16H 57/021 |
| 2016/0285331 | A1* | 9/2016 | Ichikawa | G01D 5/145 |
| 2017/0284533 | A1* | 10/2017 | Biermann | F16H 57/029 |
| 2018/0058567 | A1* | 3/2018 | Engel | B01F 15/00487 |
| 2018/0152081 | A1* | 5/2018 | Sakai | H02K 5/161 |
| 2018/0223729 | A1* | 8/2018 | Gilges | F16B 33/004 |
| 2018/0363754 | A1* | 12/2018 | Jiang | H02K 7/116 |
| 2018/0363758 | A1* | 12/2018 | Jiang | B25J 19/00 |
| 2019/0024772 | A1* | 1/2019 | Ketchel | F16H 57/021 |
| 2019/0078674 | A1* | 3/2019 | Dzafic | F16H 1/28 |
| 2019/0214859 | A1* | 7/2019 | Corcoran | H02K 1/22 |
| 2019/0305618 | A1* | 10/2019 | Mizukoshi | B25J 9/0009 |

FOREIGN PATENT DOCUMENTS

| | | | |
|---|---|---|---|
| JP | 2002-096285 A | 4/2002 | |
| JP | 2009-121550 A | 6/2009 | |
| JP | 2011-024406 A | 2/2011 | |
| JP | 2013-211958 | 10/2013 | |
| WO | WO 2014/185489 A1 | 11/2014 | |
| WO | WO-2014185489 A1 * | 11/2014 | ............ H02K 7/116 |

* cited by examiner

Fig.9

DRIVING APPARATUS

RELATED APPLICATIONS

This is a Continuation of PCT International Application PCT/JP2017/005080 filed on Feb. 13, 2017, which in turn claims benefit of Japanese Patent application JP 2016-033850 filed on Feb. 25, 2016, the entire contents of each of which incorporated herein by reference.

BACKGROUND OF THE INVENTION

1. Field of the Invention

The present invention relates to a driving apparatus that is suitably used for industrial robots, for example.

2. Description of the Related Art

Conventionally, driving apparatuses have been used to drive industrial robots. For example, Patent Literature 1 proposes a driving apparatus including an input shaft that rotates with the power of a motor, a reduction gear that receives the power of the motor from the input shaft, and an output shaft that rotates with the power output from the reduction gear.

The input shaft of the driving apparatus has a hollow space formed therein that penetrates through the input shaft in the axial direction, and the output shaft is inserted through the hollow space. The reduction gear is arranged on one side of the motor, and a detector, which detects information on the rotation of the input shaft and the output shaft, is arranged on the other side of the motor.

CITATION LIST

Patent Literature

Patent Literature 1: JP 2522495 Y2

SUMMARY OF THE INVENTION

By the way, for this type of driving apparatus, a structure may be adopted in which a coupling is attached to a tip end of the output shaft so as to transmit the power output from the reduction gear to the output shaft. However, if foreign matter from the reduction gear intrudes into the coupling side, the rotation accuracy of the output shaft may be adversely affected.

According to the first aspect of the present invention, there is provided a driving apparatus including an input shaft with a hollow space; a motor configured to rotate the input shaft; a reduction gear arranged on one side of the motor, the reduction gear being configured to receive the power of the motor from the input shaft; an output shaft inserted through the hollow space of the input shaft, the output shaft being adapted to rotate about the rotation axis of the motor; a coupling connected to a tip end of the output shaft on the one side of the motor; and a detector provided on another side of the motor, the detector being configured to detect information on the rotation of the input shaft and information on the rotation of the output shaft, in which a first limiting member is arranged between the reduction gear and the coupling, the first limiting member being adapted to limit movement of foreign matter toward the coupling side.

According to the second aspect of the present invention, there is provided a driving apparatus including an input shaft with a hollow space formed therein, the hollow space penetrating through the input shaft in the axial direction; a motor configured to rotate the input shaft about the rotation axis along the axial direction; a reduction gear arranged on one side of the motor, the reduction gear being configured to receive the power of the motor from the input shaft; an output shaft inserted through the hollow space of the input shaft, the output shaft being adapted to rotate about the rotation axis with the power output from the reduction gear; a coupling connected to the output shaft on the one side of the motor so as to transmit the power output from the reduction gear to the output shaft; and a detector provided on another side of the motor, the detector being configured to detect information on the rotation of the input shaft and information on the rotation of the output shaft, in which the inside of the reduction gear is filled with grease, the input shaft being arranged such that the input shaft penetrates through the inside of the reduction gear, a first oil seal is arranged between the reduction gear and the coupling, the first oil seal being adapted to limit the intrusion of the grease in the reduction gear into the coupling side, and a second oil seal is arranged in the hollow space between the input shaft and the output shaft, the second oil seal being adapted to limit the intrusion of the grease into the hollow space.

According to the third aspect of the present invention, there is provided a driving apparatus including an input shaft with a hollow space formed therein; a motor configured to rotate the input shaft; a reduction gear arranged on one side of the input shaft, the reduction gear being configured to receive the power of the motor from the input shaft; an output shaft inserted through the hollow space of the input shaft, the output shaft being adapted to rotate with the power output from the reduction gear; a coupling connected to the output shaft on the one side of the input shaft; and a limiting member arranged between the reduction gear and the coupling, the limiting member being adapted to limit the intrusion of foreign matter into the coupling.

DETAILED DESCRIPTION OF THE PREFERRED EMBODIMENTS

Hereinafter, several embodiments for carrying out the present invention will be described with reference to FIGS.

1 to 9. It should be noted that the scope of the present invention is not limited to the following embodiments, and can be changed as appropriate within the spirit and scope of the present invention.

First Embodiment

1. Regarding the Structure of a Driving Apparatus 100

Figure 1:
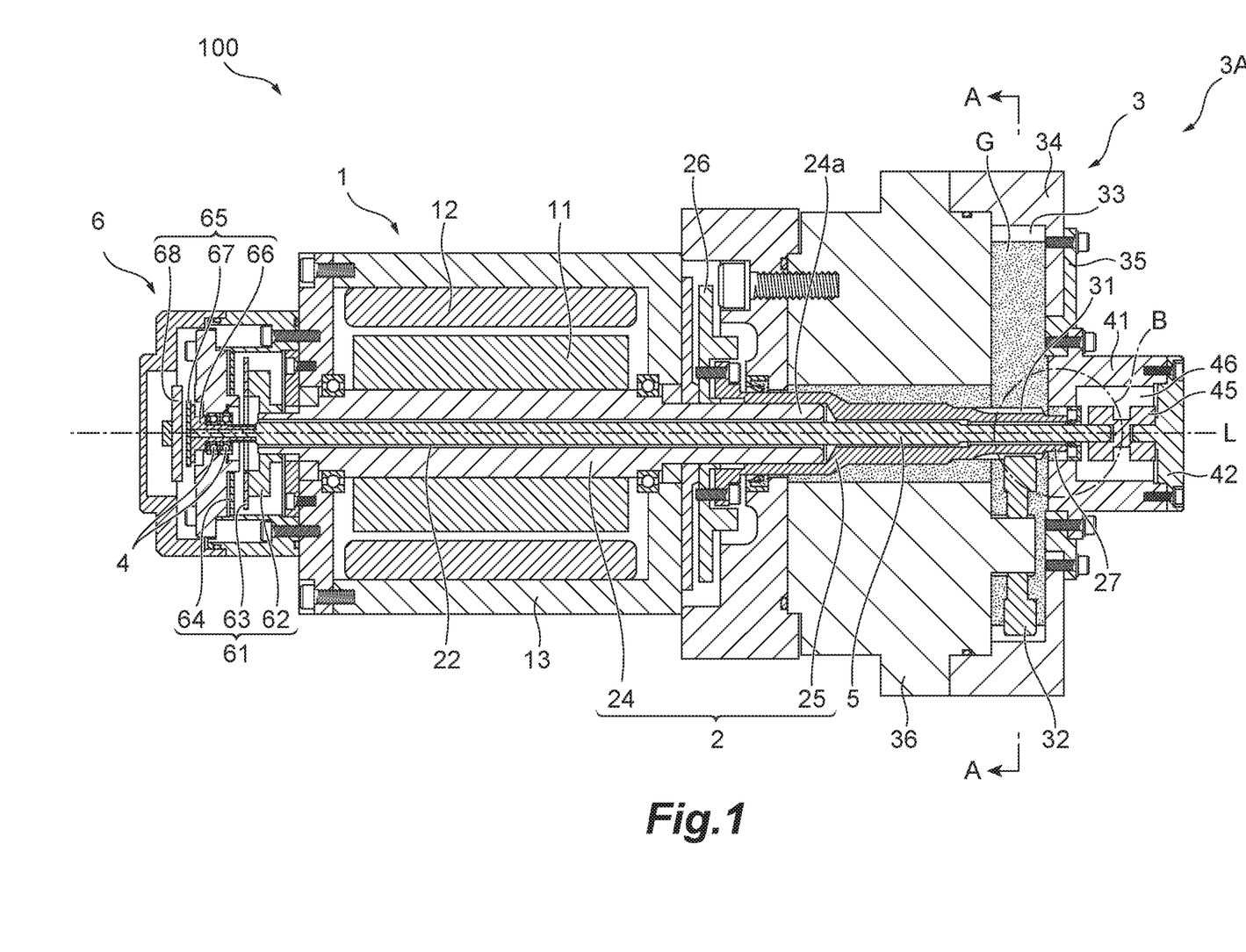
FIG. 1 is a schematic cross-sectional view illustrating the entire configuration of a driving apparatus in accordance with the first embodiment.
Figure 2:
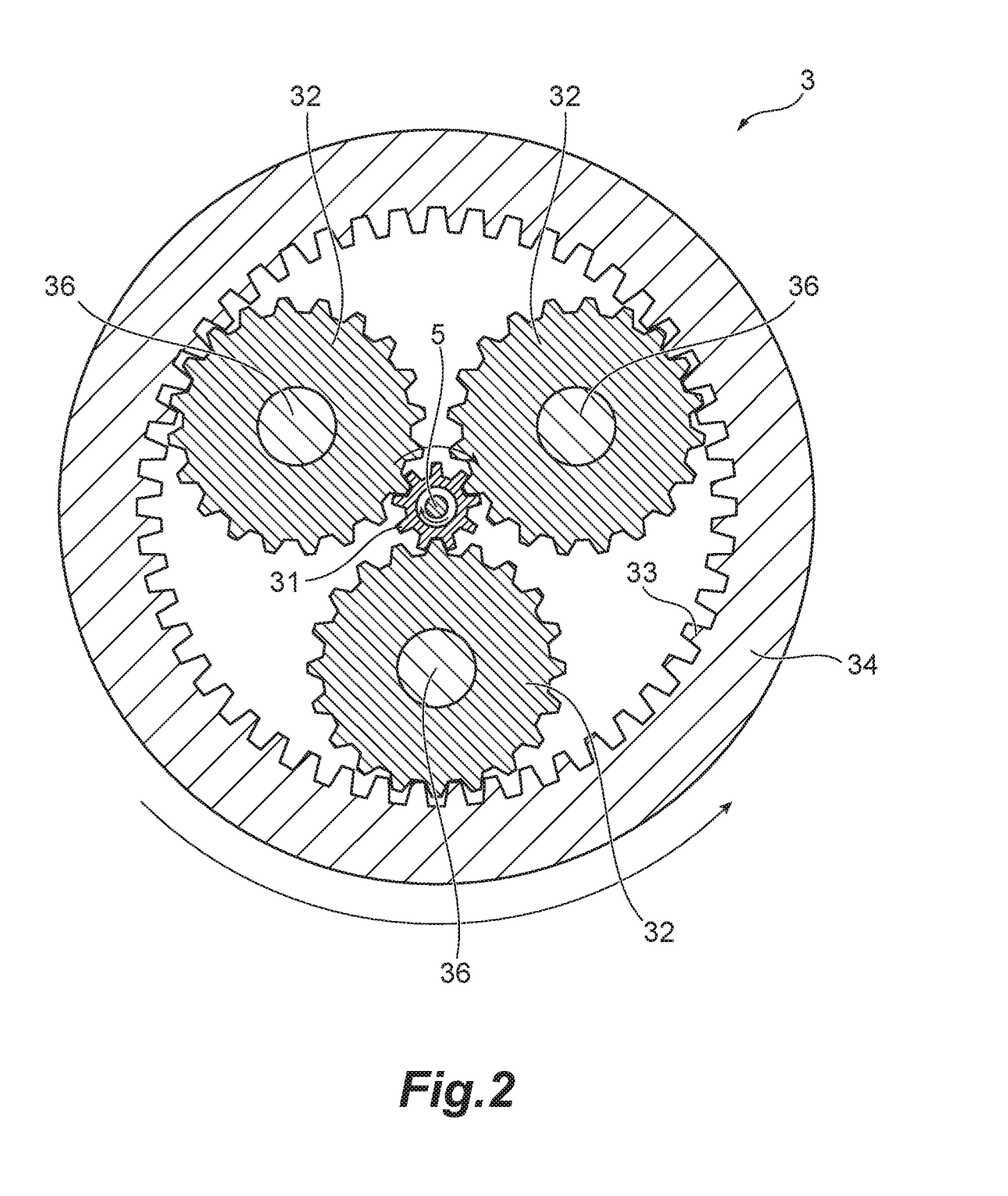
FIG. 2 is a cross-sectional view taken along line A-A of FIG. 1.
Figure 3:
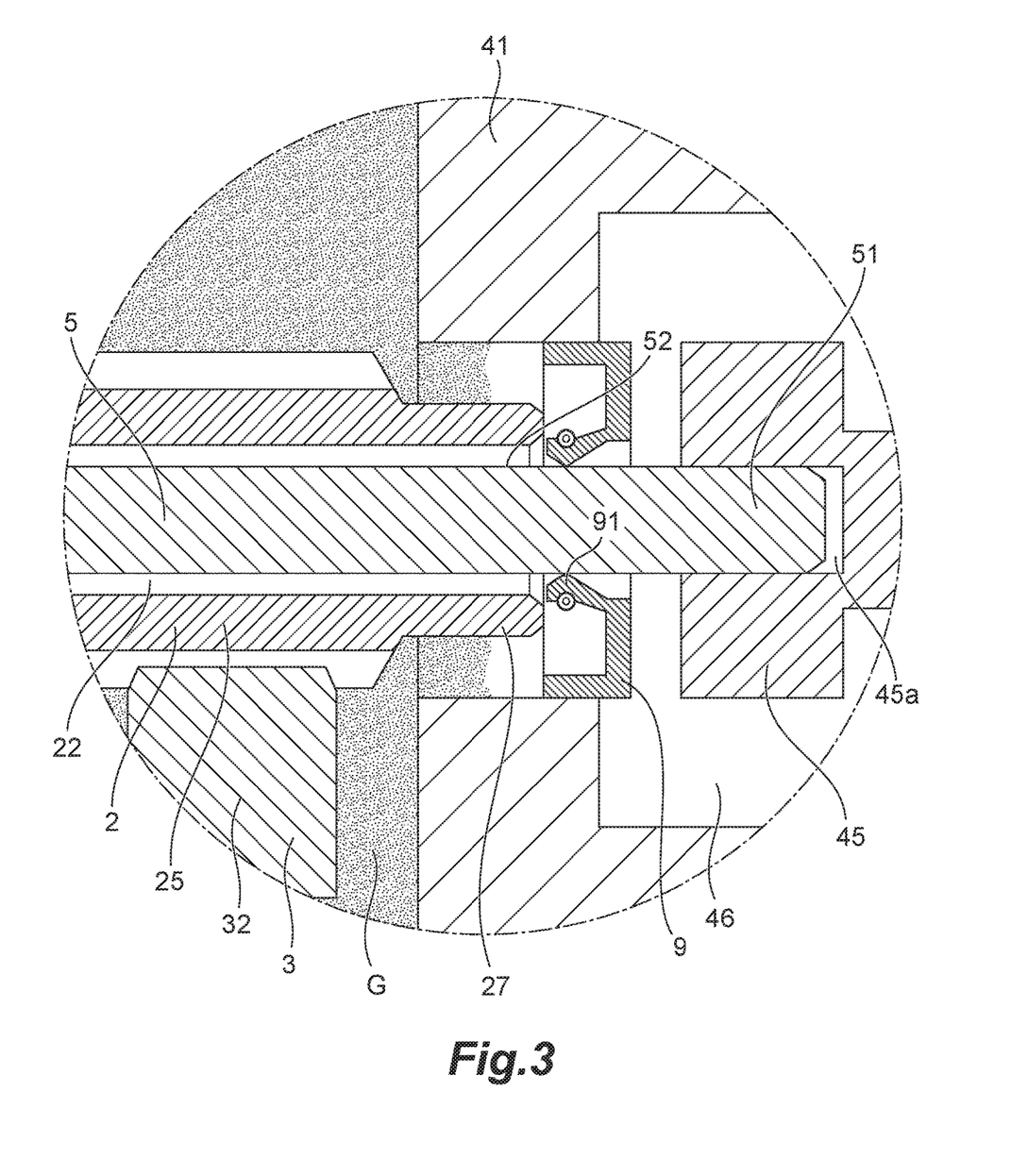
FIG. 3 is an enlarged cross-sectional view of a region around a portion B illustrated in FIG. 1.
Figure 4:
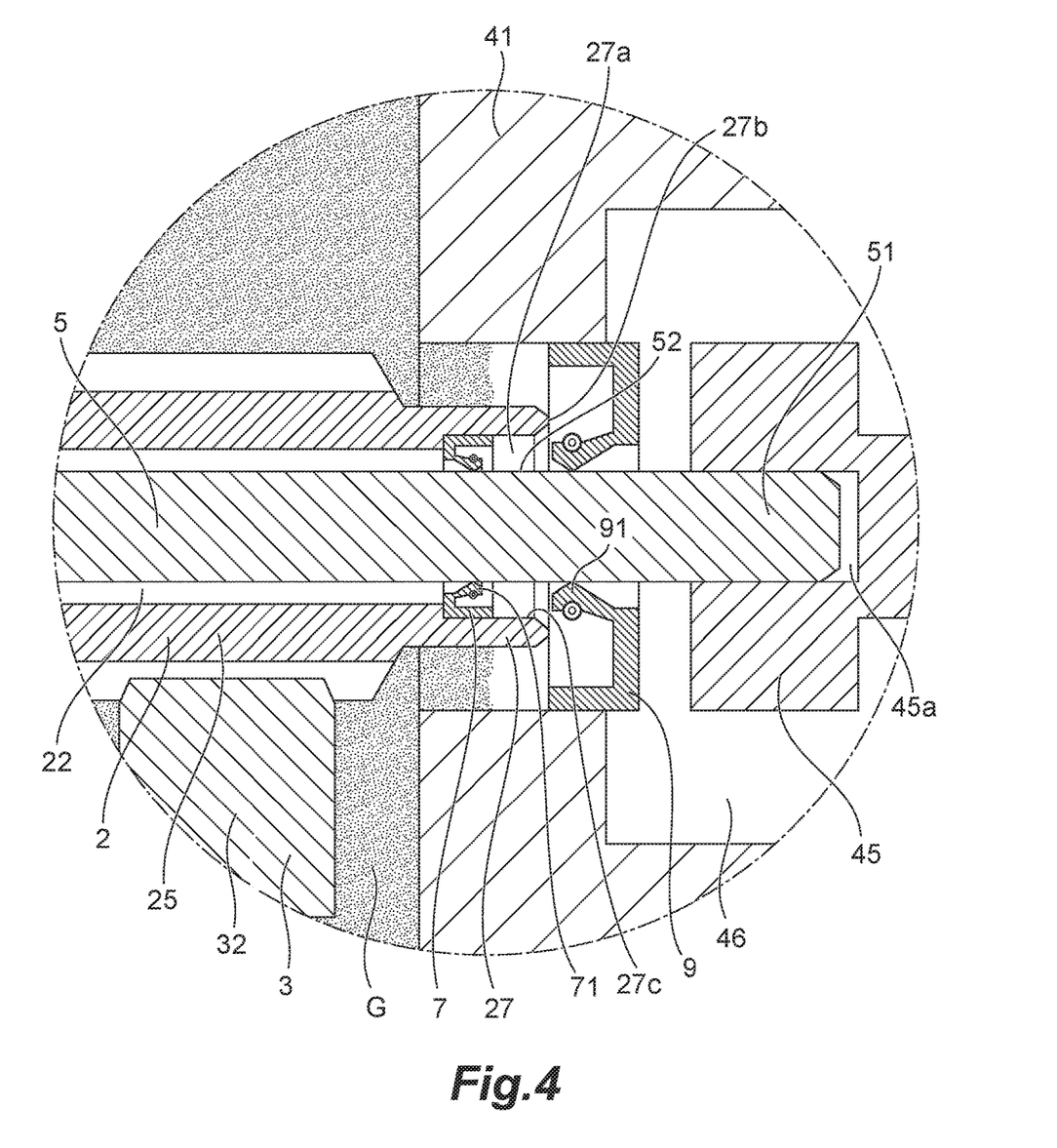
FIG. 4 is an enlarged cross-sectional view in accordance with a modified example of the driving apparatus illustrated in FIG. 3.

FIG. 1 is a schematic cross-sectional view illustrating the entire configuration of a driving apparatus 100 in accordance with the first embodiment. FIG. 2 is a cross-sectional view taken along line A-A of FIG. 1. FIG. 3 is an enlarged cross-sectional view of a region around a portion B illustrated in FIG. 1. FIG. 4 is an enlarged cross-sectional view in accordance with a modified example of the driving, apparatus illustrated in FIG. 3.

As illustrated in FIG. 1, the driving apparatus 100 in accordance with this embodiment is an apparatus that is used for a robot, for example, and that has a configuration in which power from a motor 1 is input to a transmitter 3A including a reduction gear 3, for example, via an input shaft 2, and an output shaft 5 is rotationally driven via the transmitter 3A. The driving apparatus 100 includes at least the motor 1, the input shaft 2, the transmitter 3A, and the output shaft 5, and further includes a detector 6 as a more preferable configuration.

The motor 1 is a servomotor of a synchronous motor that includes at least a rotor 11 having a permanent magnet arranged thereon, a stator 12 having a coil arranged thereon, and a casing 13 housing them. In this embodiment, although an electric motor is used for the motor 1, an air motor that uses air as power, a hydraulic motor that uses hydraulic pressure as power, or the like can also be used.

The rotor 11 of the motor 1 has a first shaft 24 coupled thereto. A tip end of the first shaft 24, located on one side of the motor 1, has a second shaft 25 integrally attached thereto via an attachment 26. In this embodiment, the first shaft 24 and the second shaft 25 form the input shaft 2 that inputs the power of the motor 1 to the reduction gear 3 of the transmitter 3A.

The input shaft 2 is substantially cylindrical in shape, and rotates about the rotation axis L as the motor 1 is rotationally driven. The input shaft 2 has a hollow space 22 formed therein that penetrates through the input shaft 2 in the axial direction (the direction of the axis), and the output shaft 5 is inserted through the hollow space 22. It should be noted that the axial direction is the direction that serves as the central line of a rotational motion when the input shaft 2 rotates, and that coincides with the rotation axis L. The input shaft 2 through which the output shaft 5 is inserted is arranged such that the input shaft 2 penetrates through the opposite sides of the motor 1.

The transmitter 3A, which transmits the rotation of the input shaft 2 to the output shaft 5, is arranged on one side of the motor 1, that is, the other side of the input shaft 2. One side of the motor 1 may be rephrased as the transmitter 3A side of the motor 1. The transmitter 3A may include the reduction gear 3. The reduction gear 3 receives the power of the motor 1 from the input shaft 2. Although a planetary gear mechanism is used for the reduction gear 3 in this embodiment, a harmonic gear mechanism or a mechanical reduction gear may also be used, for example.

As illustrated in FIG. 2, the planetary gear mechanism in accordance with this embodiment includes a sun gear 31 that rotates about the rotation axis L, three planet gears 32 that rotate while meshing with the sun gear 31, and an internal gear 33 that rotates while meshing with the three planet gears 32. The sun gear 31 is formed on the input shaft 2 (specifically, the second shaft 25), and the internal gear 33 is formed on a cover 34 of the reduction gear 3. Each of the three planet gears 32 is coupled to a planet carrier 36 so as to be rotatable.

With the aforementioned configuration, the power of the motor 1 transmitted from the input shaft 2 is transmitted to the reduction gear 3, and with the transmitted power, the cover 34, which has the internal gear 33 formed thereon, rotates about the rotation axis L. Lubricant G, such as grease or oil like oil mist, is housed within the reduction gear 3, and the input shaft 2 is connected to the reduction gear 3 as a tip end 27 of the input shaft 2 is inserted into the reduction gear 3. When the input shaft 2 is connected to the reduction gear 3, the input shaft 2 is supported by the planet gears 32 of the reduction gear 3. Although the sun gear 31 is formed on the input shaft 2 in this embodiment, the sun gear 31 and the input shaft 2 may be formed as separate members and coupled together.

The planet carriers 36 and the cover 34 that partially form the reduction gear 3 can be selectively fixed. When the planet carriers 36 and the cover 34 are not fixed, the planet gears 32 and the internal gear 33 can independently revolve about the sun gear 31. Meanwhile, when the planet carriers 36 and the cover 34 are fixed, the planet gears 32 and the internal gear 33 can integrally revolve about the sun gear 31. In this manner, the reduction gear ratio of the reduction gear 3 can be changed.

The cover 34 of the reduction gear 3 is coupled to one side of a coupling 45 via a plate-like first power transmission member 35, a cylindrical second power transmission member 41, and a third power transmission member 42. Accordingly, the rotation of the cover 34 of the reduction gear 3 can be transmitted to the output shaft 5. It should be noted that one of the first, second, and third power transmission members 35, 41, and 42, for example, may partially form a robot body (not illustrated), or one of them may be connected to the robot body. Consequently, the robot can be operated as the cover 34 rotates.

A joint housing chamber 46 for housing the coupling 45 is formed in an internal space that is formed by the second power transmission member 41 and the third power transmission member 42. The coupling 45 arranged in the joint housing chamber 46 couples the third power transmission member 42 to the output shaft 5 on one side of the input shaft 2 that is one side of the motor 1. With such a configuration, the coupling 45 transmits the power output from the reduction gear 3 to the output shaft 5. With the power output from the reduction gear 3, the output shaft 5 can rotate about the rotation axis L. In addition, since a tip end 51 of the output shaft 5 is coupled to the coupling 45, eccentricity of the output shaft 5 with respect to the rotation axis L can be adjusted. Although the transmitter 3A includes the reduction gear 3, the first, second, and third power transmission members 35, 41, 42, and the coupling 45, for example, the configuration of the transmitter 3A is not particularly limited as long as the transmitter 3A includes at least the reduction gear 3 and the coupling 45, and can transmit the rotation of the input shaft 2 to the output shaft 5.

The output shaft 5 is an elongated cylindrical member, and is inserted through the hollow space 22 of the input shaft 2 without contacting the input shaft 2, so as to rotate with the power output from the reduction gear 3. The output shaft 5 is longer than the input shaft 2, and an end of the output shaft 5 protrudes beyond an end of the input shaft 2. The opposite ends of the output shaft 5 may protrude beyond the opposite ends of the input shaft 2. If the output shaft 5 protrudes on one side of the motor 1, the protruding portion (protrusion) that is the tip end 51 of the output shaft 5 protrudes beyond the reduction gear 3 and the hollow space 22 on the reduction gear 3 side, and this portion is coupled to the coupling 45. The tip end 51 on one side of the output shaft 5 may protrude beyond the hollow space 22 and be connected to the coupling 45 as described above. In addition, a portion on the other side of the output shaft 5 may also protrude beyond the hollow space 22 toward the detector 6 side. The output shaft 5 may be supported by a bearing (first bearing) 4, on the protrusion protruding beyond the hollow space 22 toward the detector 6.

More preferably, the detector 6, which detects rotation information (information on the rotation) of the input shaft and the output shaft, is arranged on the other side of the motor 1, that is, the other side of the input shaft 2. The other side of the motor 1 may be rephrased as the detector side of the motor 1. The detector 6 includes a first detector 61 and a second detector 65. The first detector 61 detects information on the rotation (for example, the direction of the rotation, the angular position, and the number of revolutions) of the input shaft 2. The first detector 61 includes a rotating hub 62, a scale 63, and a sensor (rotation detector) 64. The rotating hub 62 is fixed on an end of the input shaft 2, and the disk-like scale 63 is fixed on the rotating hub 62. Accordingly, the input shaft 2, the rotating hub 62, and the scale 63 are integrally rotatable.

The rotation detector 64 is fixed at a position opposite the scale 63. The rotation detector 64 is a photodetector or a magnetic detector, for example. For example, when the rotation detector 64 is a photodetector, the surface of the scale 63 is irradiated with a detection beam, and the detection beam reflected by an index pattern formed on the surface is received by light-receiving elements, such as photodiodes, for example. The rotation detector 64 can detect information on the rotation of the input shaft 2.

The second detector 65 detects information on the rotation (for example, the direction of the rotation, the angular position, and the number of revolutions) of the output shaft 5. The second detector 65 includes a rotating hub 66, a scale 67, and a sensor (rotation detector) 68. The second detector 65 can detect information on the rotation of the output shaft 5 on the basis of the same principle as the first detector 61. It should be noted that the principle of detecting, with the first detector 61, information on the rotation of the input shaft 2 may differ from the principle of detecting, with the second detector 65, information on the rotation of the output shaft 5.

As illustrated in FIG. 3, a first limiting member 9 is arranged on one side of the motor 1. The first limiting member 9 is, for example, press-fitted into the second power transmission member 41. The first limiting member 9 is arranged between the reduction gear 3 and the coupling 45, and limits (suppresses) the movement (intrusion) of foreign matter from the reduction gear 3 into the joint housing chamber 46 of the coupling 45 (toward the coupling 45 side). Foreign matter is discharged from, for example, the reduction gear. Examples of the foreign matter include powder and a fluid, such as the lubricant G, in the reduction gear 3. In addition, the foreign matter is a contaminant, for example. If the foreign matter moves toward the coupling 45 or the detector 6, the rotation of the shafts or the operation of the apparatus, such as detection of information on the rotation, may be adversely affected. Therefore, the first limiting member 9 can prevent such adverse effect on the apparatus by suppressing the movement of foreign matter from the reduction gear 3 toward the coupling 45.

The first limiting member 9 may be, for example, a first blocking member with a first seal. Examples of the first blocking member include an oil seal (first oil seal) illustrated in FIG. 3. The blocking member is arranged such that it suppresses (blocks) the movement of foreign matter, such as the lubricant G, from the reduction gear 3 toward the coupling 45. If the first blocking member has a target sealing direction, it is arranged in an orientation such that it suppresses the movement of foreign matter, such as the lubricant G, from the reduction gear 3 toward the coupling 45. It should be noted that the first blocking member may be any element as long as it can seal oil, for example, an O-ring or a lip packing.

The seal includes a lip 91, for example. The lip 91 is annular in shape, for example, and is in contact with the outer periphery 52 of the output shaft 5 at a position where the inside of the reduction gear 3 is separated from the coupling 45 by the first limiting member 9. The lip 91 is made of a flexible elastomer, for example, and is tightly attached to the outer periphery 52 of the output shaft 5. A tip end of the lip 91 is pressed against the outer periphery 52 of the output shaft 5, and has a function of sealing foreign matter. The lip 91 has, by maintaining the stable contact state between its tip end and the shaft surface, a function of sealing foreign matter even when machine vibration or fluctuation in the pressure of a sealed fluid occurs. In addition, the first limiting member 9 may also be a bearing.

Further, as in a modified example illustrated in FIG. 4, a second limiting member 7 may also be arranged on one side of the motor 1 in the hollow space 22 between the input shaft 2 and the output shaft 5. The second limiting member 7 may be a second blocking member, for example, and examples thereof include an oil seal (second oil seal) illustrated in FIG. 4. If the second limiting member 7 is a second blocking member, the second limiting member 7 is arranged in an orientation such that it limits (blocks) the movement of foreign matter, such as powder or the lubricant G in the reduction gear 3, from the coupling 45 side toward the detector 6 side.

Specifically, the tip end 27 of the input shaft 2 has a housing recess 27a formed therein, and the second limiting member 7 is housed in the housing recess 27a. The second limiting member 7 may also be a second blocking member with a second seal, for example. If the second blocking member has a target sealing direction, it is arranged in an orientation such that it suppresses (blocks) the movement of foreign matter toward the detector side.

The second seal has a lip 71, for example. The lip 71 is annular in shape, for example, and is in contact with the outer periphery 52 of the output shaft 5 at a position where the lip 71 separates the hollow space 22 from its outside. The lip 71 is made of a flexible elastomer, for example, and is tightly attached to the outer periphery 52 of the output shaft 5. A tip end of the lip is pressed against the outer periphery 52 of the output shaft 5, and has a function of sealing foreign matter. In addition, the second limiting member 7 may also be a bearing.

It should be noted that in the present modified example, using an oil seal as each of the first limiting member 9 and the second limiting member 7 can specify the direction of intrusion of foreign matter, and thus limit (prevent) the intrusion of the foreign matter further reliably. Further, a seal bearing or a labyrinth structure, for example, can also be adopted as long as it can limit the intrusion of foreign matter in the aforementioned direction.

If the first limiting member 9 and/or the second limiting member 7 are/is a labyrinth structure(s), the driving apparatus can be used for faster rotations as the first limiting member 9 is not in contact with the input shaft 2 or the output shaft 5. For example, if the first limiting member 9 is a labyrinth structure, the first limiting member 9 has a plurality of protrusions and the second power transmission member 41 also as a plurality of protrusions. The protrusions of the first limiting member 9 and the protrusions of the second power transmission member 41 are arranged such that they are alternately combined with small gaps therebetween. With such a first limiting member 9, the movement of foreign matter, which has been discharged from the reduction gear 3, toward the coupling 45 can be limited.

2. Regarding the Operation of the Driving Apparatus 100

Hereinafter, the operation of the driving apparatus 100 in this embodiment will be described.

First, when the motor 1 is driven, the input shaft 2 rotates about the rotation axis L. With the rotation of the input shaft 2, the power of the motor 1 is input to the reduction gear 3 from the input shaft 2. With the power input to the reduction gear 3, the cover 34 of the reduction gear 3 rotates the number of times corresponding to the reduction gear ratio. With the rotation of the cover 34, the output shaft 5, which is coupled to the cover 34 via the first, second, and third power transmission members 35, 41, and 42 and the coupling 45, rotates the same number of times as the cover 34.

In the first detector 61, the rotating hub 62 and the scale 63 rotate with the rotation of the input shaft 2, and the rotation detector 64 detects information on the rotation of the input shaft 2. Meanwhile, in the second detector 65, the rotating hub 66 and the scale 67 rotate with the rotation of the output shaft 5, and the rotation detector 68 detects information on the rotation of the output shaft 5.

Herein, during operation of the driving apparatus 100, there may be cases where foreign matter, such as the lubricant G, in the reduction gear 3 may flow through a region between the second power transmission member 41 and the input shaft 2. Even in such a case, since the first limiting member 9 is arranged between the reduction gear 3 and the coupling 45, the intrusion (movement) of foreign matter, such as the lubricant G, in the reduction gear 3 into the joint housing chamber 46 (toward the coupling 45 side) can be limited.

Accordingly, when the driving apparatus 100 is operated, a decrease in the rotation accuracy of the input shaft 2 and the output shaft 5 due to the intrusion of foreign matter, such as the lubricant G, can be suppressed. In particular, if the lubricant G in the reduction gear 3 is grease, viscous drag would be generated on the coupling 45 upon intrusion of the grease as foreign matter into the coupling side. However, using the first limiting member 9 can suppress such a phenomenon and thus enhance the rotation accuracy of the output shaft 5.

In addition, since the second limiting member 7 is arranged in the hollow space 22 between the input shaft 2 and the output shaft 5, the intrusion of foreign matter, such as the lubricant G, in the reduction gear 3 into the hollow space 22 of the input shaft 2 can be limited. Accordingly, contamination of the detector 6 can be prevented.

As described above, using two limiting members including the first limiting member 9 and the second limiting member 7 can suppress the movement of foreign matter, such as the lubricant G, to an unwanted place from the reduction gear 3.

Second Embodiment

Figure 5:
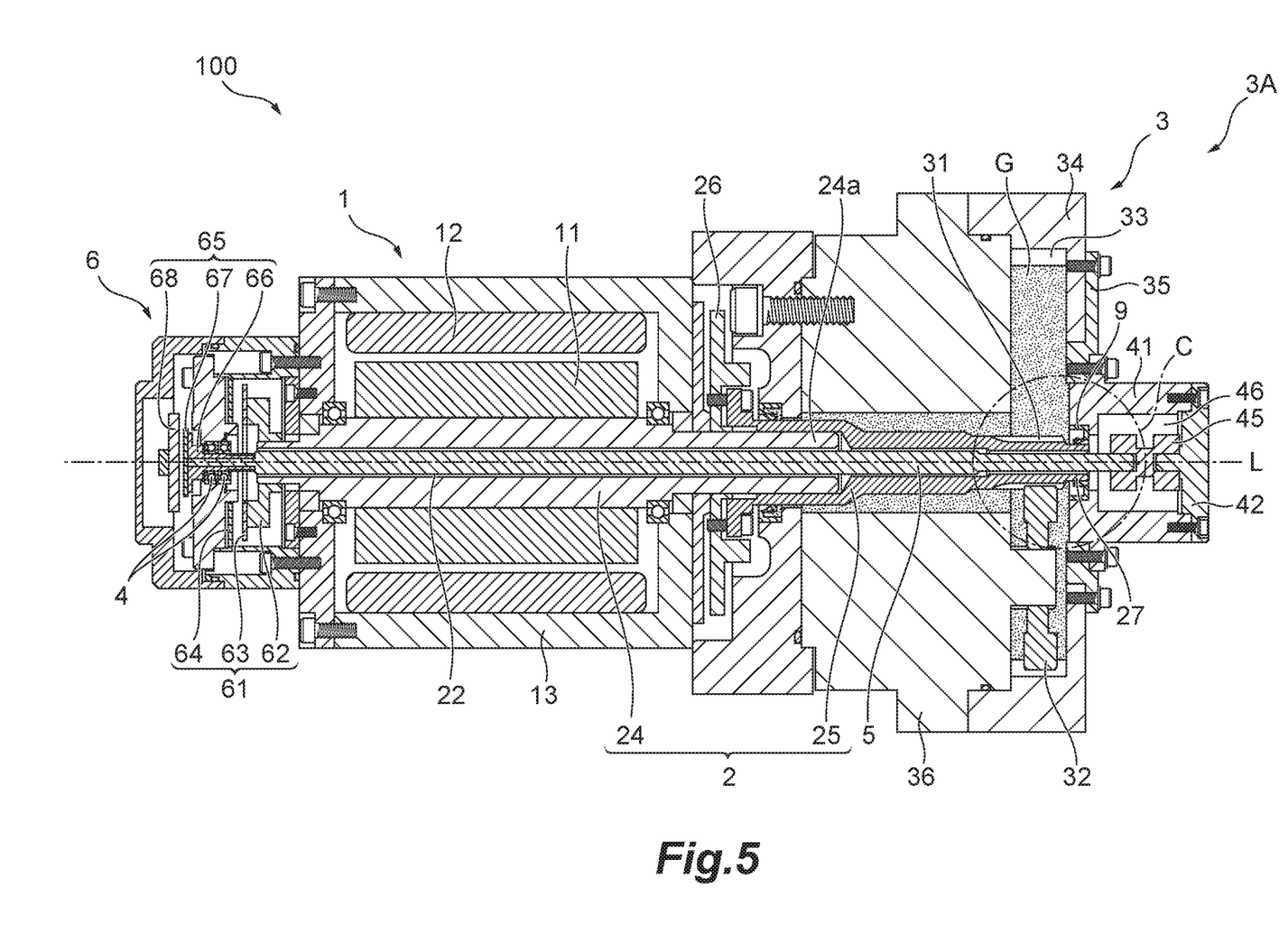
FIG. 5 is a schematic cross-sectional view illustrating the entire configuration of a driving apparatus in accordance with the second embodiment.
Figure 6:
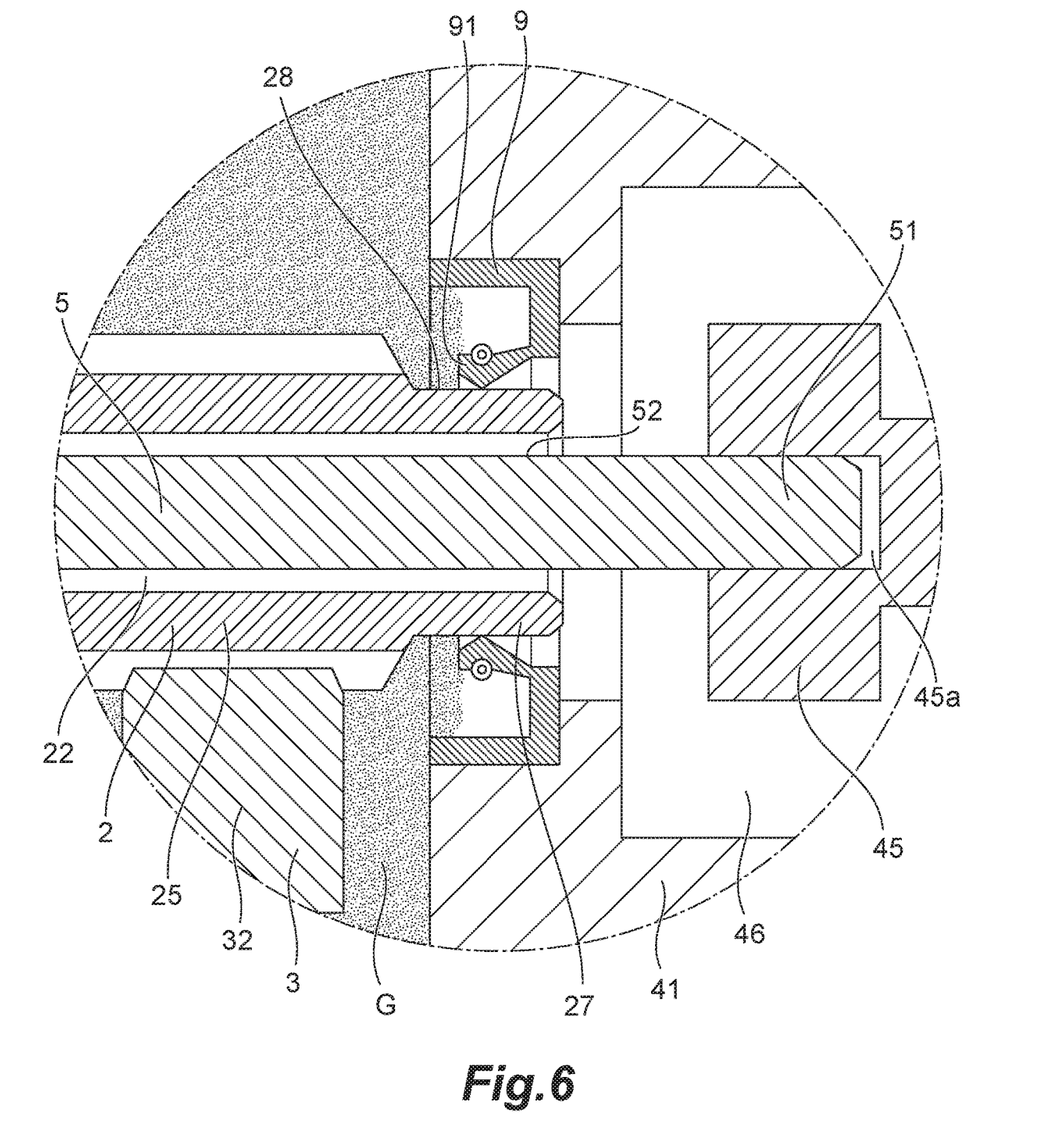
FIG. 6 is an enlarged view of a region around a portion C illustrated in FIG. 5.
Figure 7:
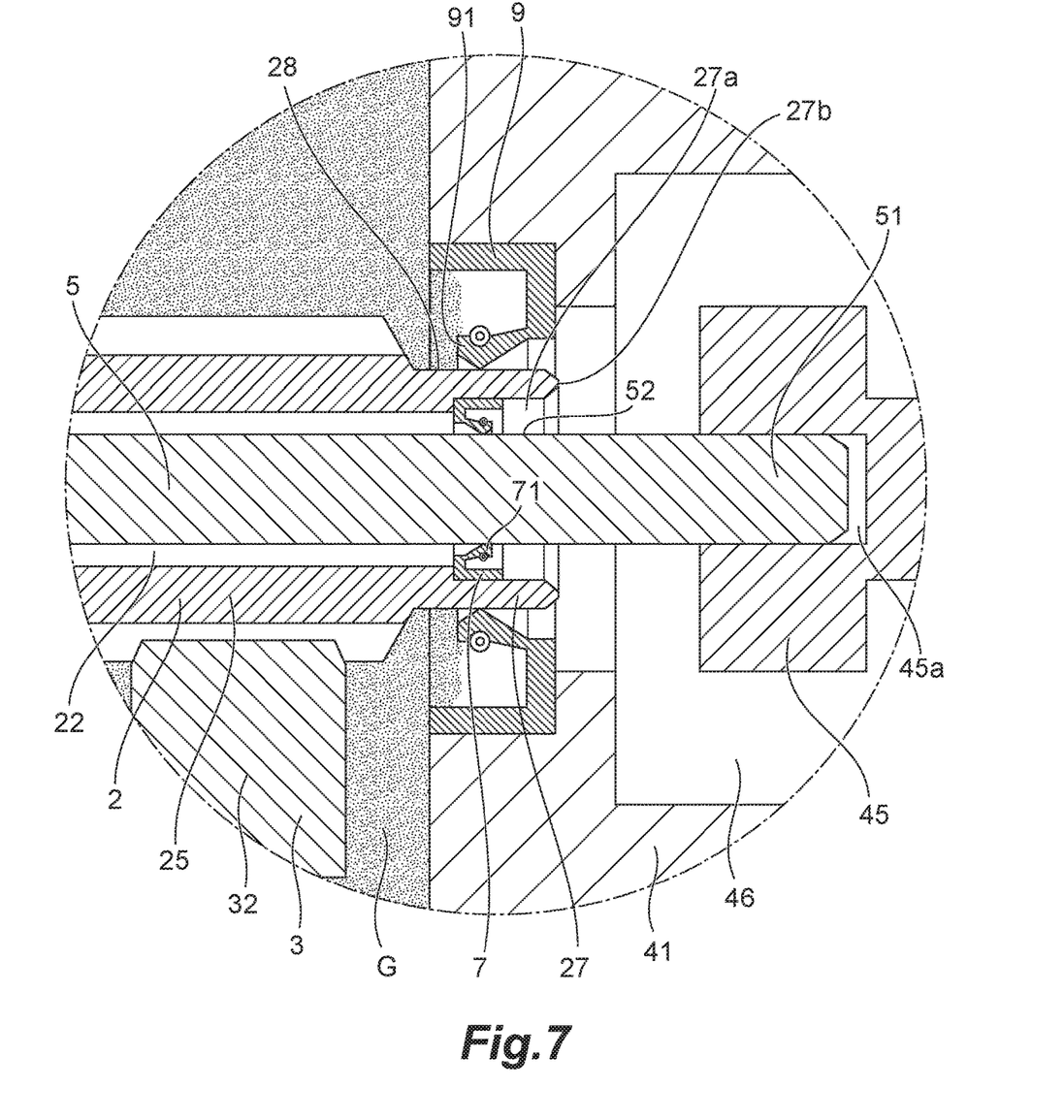
FIG. 7 is an enlarged cross-sectional view in accordance with a modified example of the driving apparatus illustrated in FIG. 6.

FIG. 5 is a schematic cross-sectional view illustrating the entire configuration of a driving apparatus in accordance with the second embodiment. FIG. 6 is an enlarged view of a region around a portion C illustrated in FIG. 5. FIG. 7 is an enlarged cross-sectional view in accordance with a modified example of the driving apparatus illustrated in FIG. 6. The driving apparatus 100 in the second embodiment differs from that in the first embodiment in the position of the first limiting member 9. Therefore, in this embodiment, elements that are the same as or equivalent to those in the first embodiment are denoted by the same reference numerals, and the description thereof will be omitted or simplified.

As illustrated in FIG. 6, in the driving apparatus 100 in accordance with the second embodiment, the first limiting member 9 is arranged between the reduction gear 3 and the coupling 45, so as to limit (suppress) the movement (intrusion) of foreign matter from the reduction gear 3 into the joint housing chamber 46 of the coupling 45 (toward the coupling 45 side). The first limiting member 9 may be, for example, a blocking member with a seal. If the blocking member has a target sealing direction, it is arranged in an orientation such that it limits the intrusion of foreign matter, such as the lubricant G, in the reduction gear 3 into the joint housing chamber 46 of the coupling 45 (toward the coupling 45 side). This point is similar to the first limiting member in accordance with the first embodiment.

In this embodiment, the first limiting member 9 is attached such that it contacts the outer periphery of the input shaft. Accordingly, the first limiting member 9 can suppress the flow of foreign matter, such as the lubricant G, from the inside of the reduction gear 3 into the hollow space 22 of the input shaft 2, without contacting the output shaft 5. The first limiting member 9 is a blocking member with a seal, for example, and the seal includes a lip 91, for example. The lip 91 is in contact with the outer periphery 28 of the input shaft 2 at a position where the inside of the reduction gear 3 is separated from the coupling 45 by the first limiting member 9. The lip 91 is made of a flexible elastomer, for example, and is tightly attached to the outer periphery 52 of the input shaft 2.

In this embodiment, since the first limiting member 9 is not in contact with the output shaft 5, it will not become rotational resistance on the output shaft 5. Therefore, the rotation accuracy of the output shaft 5 can be further enhanced.

Further, as in the modified example illustrated in FIG. 7, the second limiting member 7 may also be provided. In such a case, the driving apparatus 100 has a structure in which the first limiting member 9 and the second limiting member 7 are arranged in this order on a route through which foreign matter, such as the lubricant G, flows from the inside of the reduction gear 3 toward the hollow space 22 of the input shaft 2. Accordingly, the movement of foreign matter, which has been discharged from the inside of the reduction gear 3, to the detector 6 through the input shaft 2 can be further limited. For example, even when the seal property of the first limiting member 9 has deteriorated and foreign matter, such as the lubricant G, has flowed out of the inside of the reduction gear 3 into the joint housing chamber 46 (toward the coupling 45 side), the second limiting member 7, which is arranged on the tip end 27 of the input shaft 2, is present on the route. Meanwhile, even when the seal property of the second limiting member 7 has deteriorated, the first limiting member 9 prevents the flow of foreign matter, such as the lubricant G, from the inside of the reduction gear 3 to the tip end 27 of the input shaft 2. Therefore, foreign matter does not flow into the hollow space 22 of the input shaft 2 regardless of whether the seal property of the second limiting member 7 has deteriorated or not.

As described above, in the driving apparatus provided with the first limiting member 9 and the second limiting member 7, even when the seal property of one of the second limiting member 7 or the first limiting member 9 has deteriorated, the intrusion of foreign matter, such as the lubricant G, into the hollow space 22 of the input shaft 2 can be limited as long as the seal property of the other limiting member is ensured. Accordingly, contamination of the detector can be prevented.

Third Embodiment

Figure 8:
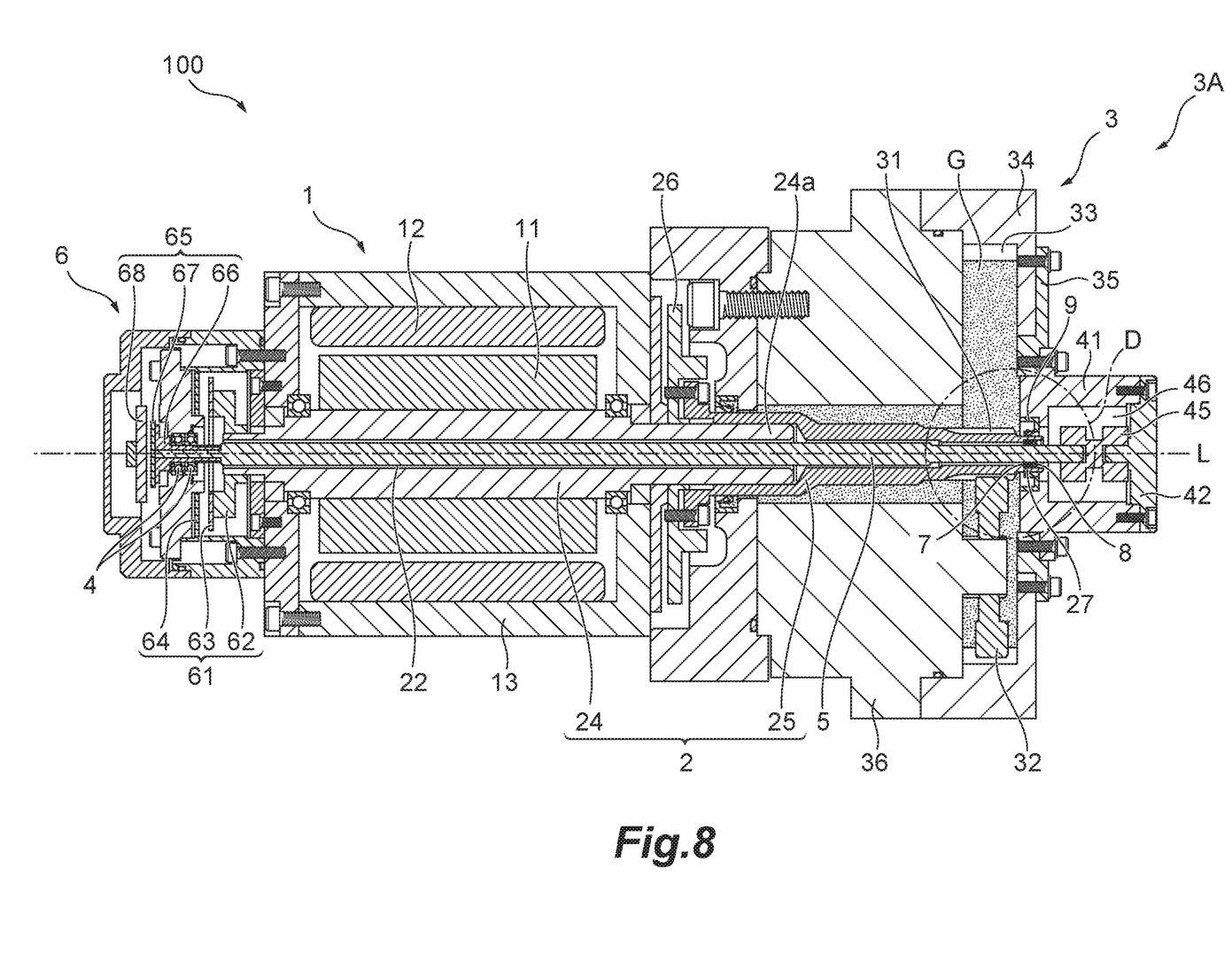
FIG. 8 is a schematic cross-sectional view illustrating the entire configuration of a driving apparatus in accordance with the third embodiment.
Figure 9:
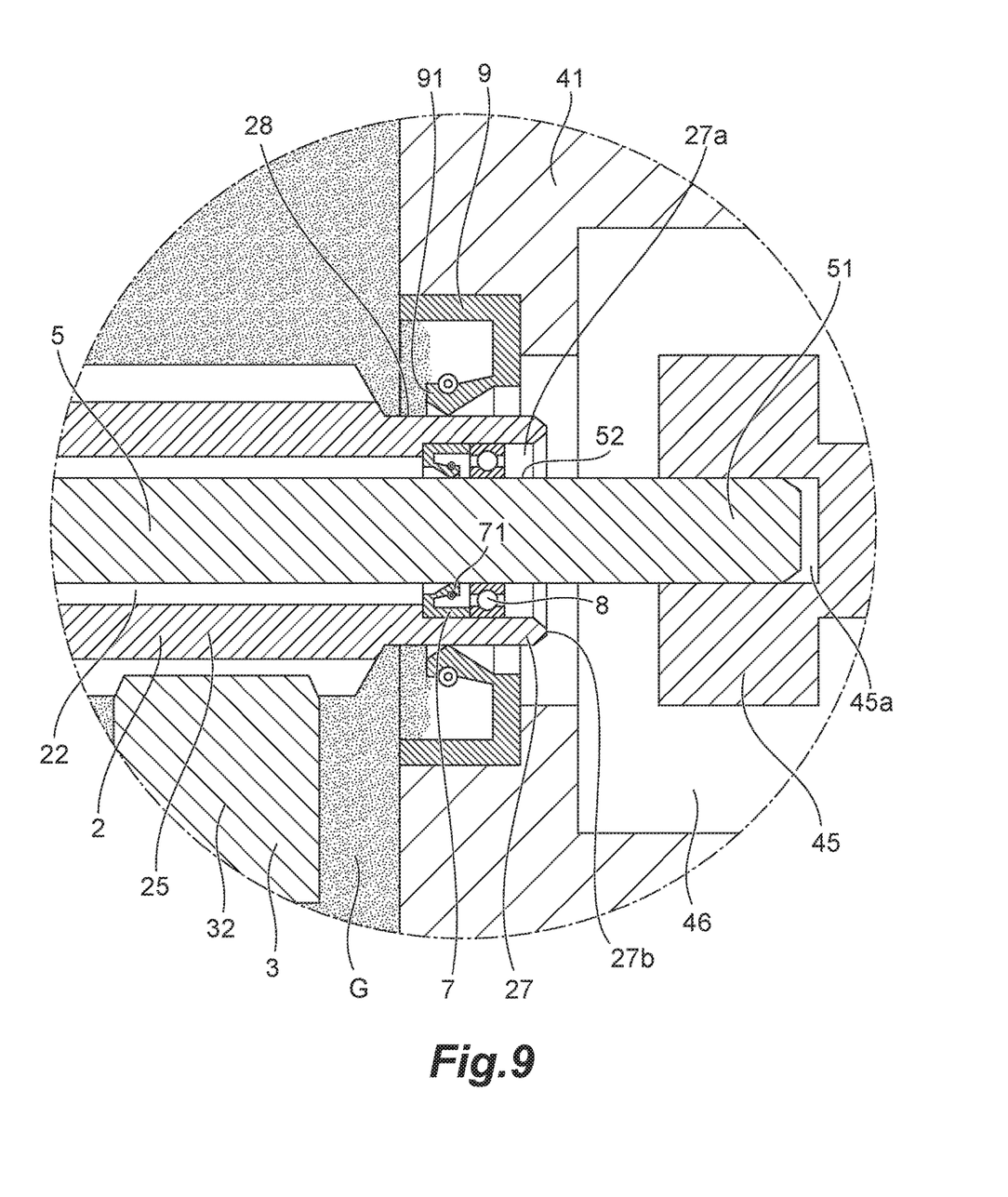
FIG. 9 is an enlarged view of a region around a portion D illustrated in FIG. 8.

FIG. 8 is a schematic cross-sectional view illustrating the entire configuration of a driving apparatus in accordance with the third embodiment. FIG. 9 is an enlarged view of a region around a portion D illustrated in FIG. 8. The driving apparatus 100 in the third embodiment differs from that in the second embodiment in that a second bearing 8 is further provided. Therefore, in this embodiment, elements that are the same as or equivalent to those in the second embodiment are denoted by the same reference numerals, and the description thereof will be omitted or simplified.

As illustrated in FIGS. 8 and 9, in the driving apparatus 100 in accordance with the third embodiment, the second bearing 8 that supports the output shaft 5 is further arranged on one side of the motor 1. More specifically, the second bearing 8 is arranged at a position adjacent to the second limiting member 7 such that the second bearing 8 is closer to the tip end 27b side of the input shaft 2 than is the second limiting member 7, in the hollow space 22 between the input shaft 2 and the output shaft 5.

As described above, since the output shaft 5 is supported by the first bearing 4 and the second bearing 8 with the motor 1 interposed therebetween, whirling of the output shaft 5 can be suppressed during operation of the driving apparatus 100. Accordingly, there is no possibility that the second limiting member 7 arranged in the hollow space 22 between the input shaft 2 and the output shaft 5 will deform excessively due to the whirling of the output shaft 5. Consequently, the seal property of the second limiting member can be maintained.

In particular, in this embodiment, since the second bearing 8 is arranged at a position adjacent to the second limiting member 7, it is possible to suppress the excessive deformation of the second limiting member 7 and maintain the seal property of the second limiting member even more.

Further, since the second bearing 8 is arranged closer to the tip end 27b side of the input shaft 2 than is the second limiting member 7, foreign matter, such as the lubricant G, which is about to intrude into the hollow space 22 of the input shaft 2, contacts the second limiting member 7 via the second bearing 8. Accordingly, even when excessive pressure is generated in the grease while the foreign matter is flowing, such pressure can be once received by the second bearing 8, and thus, positional deviation of the second limiting member 7 can be avoided. Consequently, the reliability of the second limiting member 7 can be maintained.

Although the embodiments of the present invention have been described in detail above, the specific configuration of the present invention is not limited thereto, and any design changes that are within the spirit and scope of the present invention are all included in the present invention.

In the driving apparatus of the first embodiment, the output shaft is supported only by the first bearing, but the second bearing may be further provided as illustrated in the third embodiment. In the third embodiment, the second bearing is arranged in the hollow space between the input shaft and the output shaft, but the second bearing may also be arranged between the tip end of the input shaft and the coupling, for example. Further, in the third embodiment, the second bearing is arranged closer to the tip end side of the input shaft than is the second limiting member, but the second limiting member may be arranged closer to the tip end side of the input shaft than is the second bearing.

What is claimed is:

1. A driving apparatus comprising:
    an input shaft with a hollow space, wherein the input shaft is configured to rotate about a rotation axis;
    a motor configured to rotate the input shaft about the rotation axis;
    a reduction gear arranged on one side of the motor, the reduction gear being configured to receive power of the motor from the input shaft;
    an output shaft inserted through the hollow space of the input shaft, the output shaft being adapted to rotate about the rotation axis;
    a coupling connected to a tip end of the output shaft on the one side of the motor;
    a detector provided on another side of the motor, the detector being configured to detect information on rotation of the input shaft and information on rotation of the output shaft;
    a first limiting member arranged between the reduction gear and the coupling, the first limiting member being adapted to limit movement of foreign matter toward the coupling side;
    a second limiting member arranged in the hollow space between the input shaft and the output shaft and contacting both the input shaft that is configured to rotate about the rotation axis and the output shaft that is configured to rotate about the rotation axis, the second limiting member being adapted to limit movement of the foreign matter from the one side of the motor toward the other side of the motor, wherein
        a first bearing adapted to support the output shaft is arranged on the other side of the motor;
        a second bearing adapted to support the output shaft is arranged on the one side of the motor; and
        the second bearing is arranged at a position adjacent to the second limiting member in the hollow space between the input shaft and the output shaft.

2. The driving apparatus according to claim 1, wherein:
    the first limiting member is a first blocking member with a first seal, and
    the first blocking member blocks movement of foreign matter in the reduction gear toward the coupling side.

3. The driving apparatus according to claim 2, wherein the first seal is in contact with an outer periphery of the input shaft at a position where the first seal separates an inside of the reduction gear from the coupling.

4. The driving apparatus according to claim 2, wherein the first seal is in contact with an outer periphery of the output shaft at a position where the first seal separates an inside of the reduction gear from the coupling.

5. The driving apparatus according to claim 1, wherein:
    the second limiting member is a second blocking member with a second seal, and
    the second blocking member blocks movement of foreign matter discharged from the reduction gear toward the detector side.

6. The driving apparatus according to claim 5, wherein the second seal is in contact with an outer periphery of the output shaft in the hollow space.

\* \* \* \* \*